United States Patent [19]

Magnifico

[11] 4,126,164  
[45] Nov. 21, 1978

[54] DEVICE FOR USE IN PREPARING VARIED LAYERED DRINKS

[76] Inventor: James S. Magnifico, 2951 Southwide Dr., Memphis, Tenn. 38118

[21] Appl. No.: 851,456

[22] Filed: Nov. 14, 1977

[51] Int. Cl.² .............................................. B65B 3/04
[52] U.S. Cl. .................................. 141/286; 141/100; 141/366; 222/565; 222/566
[58] Field of Search ................................ 141/100–110, 141/198–205, 286, 297, 298, 299, 300, 363, 364, 365, 366; 222/460, 565, 566

[56] References Cited

U.S. PATENT DOCUMENTS 3,256,916  6/1966  Silletti ................................. 141/286

Primary Examiner—Houston S. Bell, Jr.
Attorney, Agent, or Firm—John R. Walker, III

[57] ABSTRACT

A device for placement on the rim of a drinking glass to allow different fluids to be poured into the glass in such a manner that varied layered drinks can be easily and quickly made. The device includes a cup member for placement on the rim of the glass in such a manner that a substantially airtight seal is formed between the glass and the bottom of the cup member. A plurality of fluid passageways are formed in the bottom of the device to allow fluid to pass from within the cup member to the interior of the glass. The fluid passageways are angled downward and outward so as to direct the fluid passing therethrough substantially against the inner walls of the glass so that the fluid will run down the inner walls of the glass rather than merely falling or dripping onto the surface of any fluid already in the glass. In this manner, the incoming fluid will not break the surface tension of the fluid already present in the glass but, rather, will float on this fluid to create a varied layered drink. An air vent is provided in the bottom of the cup member to allow air to pass out of the glass as fluid flows through the fluid passageways.

10 Claims, 4 Drawing Figures

4,126,164

DEVICE FOR USE IN PREPARING VARIED LAYERED DRINKS

BACKGROUND OF THE INVENTION

1. Field of the Invention

This invention relates to devices for aiding the preparation of varied layered drinks or the like.

2. Description of the Prior Art

Heretofore various devices for use in preparing varied layered drinks have been developed. See, for example, Dineen, U.S. Pat. No. 654,879; Orme, U.S. Pat. No. 2,550,589; Busto, U.S. Pat. No. 2,740,571; Ried, U.S. Pat. No. 3,185,189; and Siletti, U.S. Pat. No. 3,256,916. None of these above patents have disclose or suggest the present invention.

Varied layered drinks, i.e., drinks having multiple layers of preferably different colored fluids or liqueurs, are extremely slow and difficult to make using present methods. More specifically, the present method most commonly used in making such varied layered drinks is to place a spoon over a first layer of fluid in a drinking glass and gently pour a different fluid having a lighter per unit weight or specific gravity over the bowl of the spoon so as the break the fall of the fluid being poured to cause the fluid to float upon the first layer of fluid without breaking the surface tension of the first layer thereby resulting in a drink having two or more distinct layers. However, this method is disadvantageous since it takes a great deal of skill to perform without bleeding or intermixing the adjacent layers of fluid and, even for highly skilled persons, is extremely slow.

SUMMARY OF THE INVENTION

The present invention is directed towards overcoming the problems and disadvantages of prior devices for and methods of preparing varied layered drinks. The concept of the present invention is to provide a device which allows fluids having different specific gravities or the like to be merely poured into a drinking glass through the present device to form a drink having distinct layers.

The device includes, in general, a cup means for receiving a quantity of fluid, the cup means having a substantially opened top into which a quantity of fluid is poured and having a substantially closed bottom for being positioned substantially centrally over the rim of a drinking glass. The cup means includes a portion for resting on the upper rim of the glass so as to form a substantially air-tight seal between the cup means and the glass. The bottom of the cup means has at least one aperture therethrough for defining a fluid passageway for allowing fluid to flow from the cup means into the glass and having an aperture therethrough for defining an air-vent for allowing air to pass from the glass when fluid is flowing into the glass through the fluid passageway. The fluid passageway is angled downwardly and outwardly for directing any fluid flowing therethrough against the inner wall of the glass. The air vent is located remote from the fluid passageway for preventing the air passing through the air vent from agitating the fluid flowing through the fluid passageway.

DESCRIPTION OF THE PREFERRED EMBODIMENT

Figure 1:
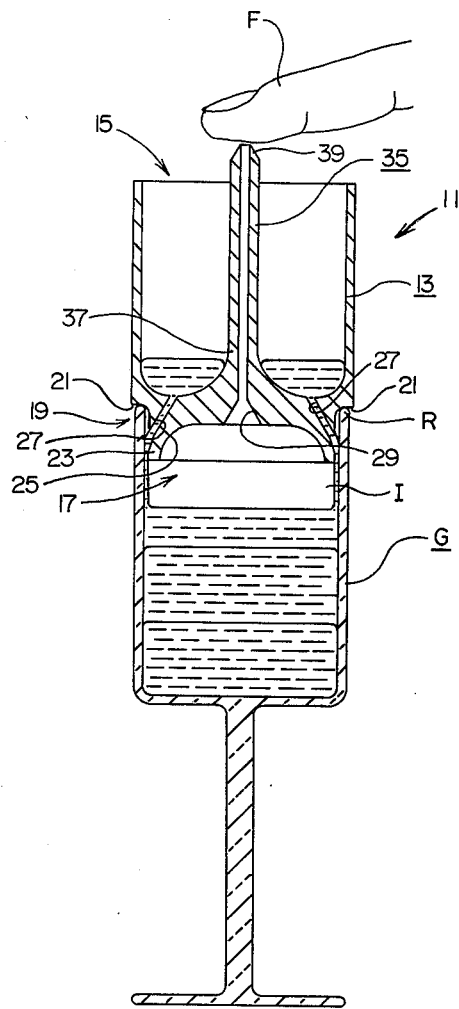
FIG. 1 is a sectional view of the device of the present invention shown resting on a glass.

The device 11 of the present invention is for use with a drinking glass G (see FIG. 1). More specifically, the device is to aid a person, such as a bartender, in preparing a varied layerd drink in the glass G. The device 11 includes, in general, a cup means 13 receiving a quantity of fluid such as a liqueur and for gently releasing that fluid into the glass G in such a manner as not to disturb or break the surface tension of any fluid already present in the glass G thereby causing the fluid being released to float upon any fluid already present in the glass G.

Figure 2:
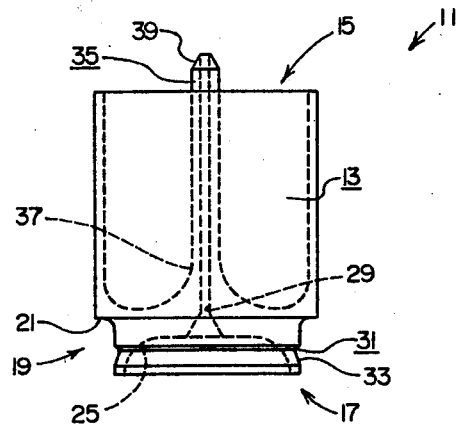
FIG. 2 is a side elevational view of the device of the present invention.
Figure 3:
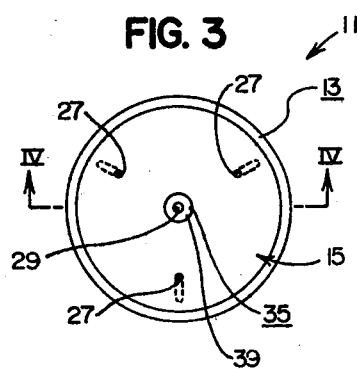
FIG. 3 is a top plan view thereof.
Figure 4:
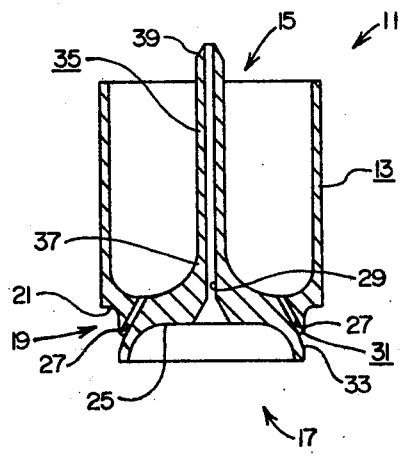
FIG. 4 is a sectional view thereof substantially as taken on line IV—IV of FIG. 3 with certain portions thereof rotated so as to be aligned with line IV—IV for sake of clarity.

The cup means 13 has a substantially opened top 15 into which a quantity of fluid can be poured and has a substantially closed bottom 17 for being positioned substantially centrally over the glass G. The bottom 17 is adapted to rest on the upper rim R of the glass G in a manner so as to form a substantially air-tight seal between the cup means 13 and the glass G (see FIG. 1). More specifically, the bottom 17 of the cup means 13 is preferably provided with an annular recess 19 around its entire periphery for defining an annular shoulder portion 21 and a boss portion 23. The shoulder portion 21 rests upon the rim R of the glass G as shown in FIG. 1 to form a substantially air-tight seal between the cup means 13 and the glass G as should now be apparent to those skilled in the art. When the shoulder portion 21 is resting upon the rim R of the glass G, the boss portion 23 extends into the interior I of the glass G as shown in FIG. 1. The boss portion 23 preferably has a substantially concaved bottom surface 25 as clearly shown in FIGS. 1 and 4 for reasons which will hereinafter become apparent. The bottom 17 of the cup means 13 has at least one and preferably three apertures therethrough for defining three fluid passageways 27 for allowing fluid to flow from the cup means 13 into the interior I of the glass G. The fluid passageways 27 are spaced substantially equal distance from one another as clearly shown in FIG. 3 and are angled downward and outward as clearly shown in FIGS. 3 and 4 for reasons which will hereinafter become apparent. The bottom 17 of the cup means 13 has another aperture therethrough for defining an air vent 29 for allowing air to pass from the interior I of the glass G when fluid is flowing into the interior I of the glass G through the fluid passageways 27. The air vent 29 is located remote from the fluid passageways 27 for reasons which will hereinafter become apparent. More specifically, the air vent 29 is preferably located centrally of the bottom 17 at the highest point on the concaved bottom surface 25 thereof while the fluid passageways 27 are preferably located on the periphery of the bottom 17 at the annular recess 19 thereof as clearly shown in the drawings. The boss portion 27 preferably has an annular groove 31 in its side as clearly shown in FIGS. 1, 2 and 4. The annular groove 31 has an outwardly and downwardly sloping lower edge 33 for reasons which will hereinafter become apparent. The lower ends of the fluid passageways 27 are communicated with the annular groove as shown in the drawings so that the fluid passing through the fluid passageways 27 will flow into the interior I of the glass G over the lower edge 33 of the groove 31.

The air vent 29 may be communicated with the top 15 of the cup means 13 for allowing the user of the device 11 to manually control the amount of air escaping through the air vent 29 by obstructing a portion of the air vent 29 (see FIG. 1). More specifically, the device 11 may include a hollow tube means 31 having a first end 33 fixedly attached to the bottom 17 of the cup means 13 substantially axially or centrally about the air vent 29 and in communication therewith as clearly shown in FIGS. 1 and 4. The tube means 35 also has a second end 39 extending above the top 15 of the cup means 13 for allowing the user of the device 11 to control the amount of air passing through the air vent 29 by placing a finger F over a portion of the second end 39 of the tube means 35 as shown in FIG. 1 and in a manner which should now be apparent to those skilled in the art. However, the device 11 is operable without the tube means 35. That is, the air vent 29 may consist of any means which allows air to escape from the interior I of the glass G without agitating the fluid flowing into the interior I of the glass G through the fluid passageways 27 such as one or more notch-like apertures or the like in the shoulder portion 21 of the bottom 17 of the cup means 13.

The device 11 may be constructed in any manner and of any material known to those skilled in the art. Preferably, the device 11 is constructed entirely of a clear plastic material.

The preferred manner of using the device 11 to aid in preparing varied layered drinks is quite simple. The device 11 is placed on the rim R of the glass G with the shoulder portion 21 thereof resting on the rim in such a manner so as to form a substantially air-tight seal therebetween as shown in FIG. 1. Next, a quantity of fluid is merely poured into the top 15 of the cup means 13. The fluid will pass into the interior I of the glass G through the fluid passageways 27 in such a manner that the fluid will float upon any fluid already present in the interior I of the glass G and will not break the surface tension thereof. The rate at which the fluid passes through the fluid passageways 27 can be controlled by the user of the device 11 by merely placing a finger F over a portion of the second end 39 of the tube means 35 as clearly shown in FIG. 1. This slows down the passage of air through the air vent 29 and, therefore, slows down the passage of fluid through the fluid passageways 27 as should now be apparent to those skilled in the art. The fluid passageways 27 will direct the fluid passing therethrough towards the interior walls or sides of the glass as clearly shown in FIG. 1 since the fluid passageways are angled downward and outward. Additionally, the groove 31 will also act to direct the fluid passing through the fluid passageways 27 against or towards the interior walls or sides of the glass G since the lower edge 33 of the groove 31 is angled downward and outward. Also, the groove 31 will cause the fluid to be substantially uniformly directed against or towards the interior walls or sides of the glass G since it extends completely around the sides of the boss portion 23. The air from within the interior I of the glass G will pass through the air vent 29 without agitating the fluid passing through the fluid passageways 27 and without forcing this fluid out of the glass G through the air vent 29 since the air vent 29 is located remote from the fluid passageways 27. The concaved bottom surface 25 of the boss portion 23 will prevent the fluid passing through the fluid pssageways 27 from moving towards the center of the bottom 17 and towards the air vent 29 due to the force of gravity as should now be apparent to those skilled in the art. In this matter, a varied layered drink can be easily and quickly prepared in the glass as will now be apparent to those skilled in the art.

Although the invention has been described and illustrated with respect to a preferred embodiment thereof, it is not to be so limited since changes and modifications may be made therein which are within the full intended scope of the invention.

I claim:

1. A device for use with a drinking glass in preparing a varied layered drink in the glass, said device comprising: cup means for receiving a quantity of fluid, said cup means having a substantially opened top into which a quantity of fluid can be poured and having a substantially closed bottom for being positioned substantially centrally over the glass, said cup means including a portion for resting on the upper rim of the glass so as to form a substantially air-tight seal between said cup means and the glass, said bottom of said cup means having at least one aperture therethrough for defining a fluid passageway for allowing fluid to flow from said cup means into the glass and having an aperture therethrough for defining an air vent for allowing air to pass from the glass when fluid is flowing into the glass through said fluid passageway, said fluid passageway being angled downward and outward for directing any fluid flowing therethrough against the inner wall of the glass, said air vent being located remote from said fluid passageway for preventing the air passing through said air vent from agitating the fluid flowing through said fluid passageway.

2. The device of claim 1 in which said air vent is communicated with said top of said cup means for allowing the user of said device to manually control the amount of air escaping through said air vent by obstructing a portion of said air vent.

3. The device of claim 1 in which said air vent is located substantially centrally of said bottom of said cup means, and in which is included a hollow tube means having a first end fixedly attached to said bottom of said cup means substantially axially about said air vent and in communication therewith and having a second end extending above said top of said cup means for allowing the user of said device to control the amount of air passing through said air vent by placing a finger over a portion of said second end of said tube means.

4. The device of claim 3 in which said bottom of said cup means has an annular recess around its entire periphery for defining an annular shoulder portion and a boss portion, said shoulder portion being adapted to rest upon the upper rim of the glass, said boss portion being adapted to extend into the interior of the glass.

5. The device of claim 4 in which said boss portion has a substantially concave bottom.

6. The device of claim 5 in which said boss portion has an annular groove in its side, said annular groove having an outwardly and downwardly sloping lower edge, said fluid passageway being communicated with said annular groove so that the fluid passing through said fluid passageway will be directed by said lower edge of said annular groove substantially uniformly against the inner wall of the glass.

7. The device of claim 6 in which said bottom of said cup means includes a plurality of apertures therethrough spaced substantially equal distance from one another for defining a plurality of fluid passageways.

8. The combination with a drinking glass having a continuous upper rim and a continuous inner wall, of a device for use with the glass in preparing varied layered drinks, said device comprising: a cup means for receiving a quantity of fluid, said cup means having a substantially opened top into which the quantity of fluid is poured and having a substantially closed bottom positioned substantially centrally over the glass, said cup means having an annular recess around its entire periphery for defining an annular shoulder portion and a boss portion, said shoulder portion resting upon the upper rim of the glass and forming a substantially air-tight seal between said cup means and the glass, said boss portion extending into the interior of the glass, said boss portion having a substantially concaved bottom surface, said bottom of said cup means having three apertures therethrough for defining three fluid passageways for allowing fluid to flow from said cup means into the interior of the glass and having another aperture therethrough for defining an air vent for allowing air to pass from the interior of the glass when fluid is flowing into the interior of the glass through said fluid passageways, said fluid passageways being spaced a substantially equal distance from one another and being angled downward and outward for directing the fluid flowing therethrough against the inner wall of the glass, said air vent being located remote from said fluid passageways for preventing the air passing through said air vent from agitating the fluid flowing through said fluid passageways; and a hollow tube means having a first end fixedly attached to said bottom of said cup means substantially axially about said air vent and in communication therewith and having a second end extending above said top of said cup means for allowing the user of said device to control the amount of air passing through said air vent by placing a finger over a portion of second end of said tube means.

9. The combination of claim 8 in which said boss portion has an annular groove in its side, and annular groove having an outwardly and downwardly sloping lower edge, said fluid passageways being communicated with said annular groove so that the fluid passing through said fluid passageways will be directed by said lower edge of said annular groove substantially uniformly against the inner wall of the glass.

10. The combination of claim 9 in which said device is constructed entirely of clear plastic.

* * * * *